US005492749A

United States Patent [19]

Solves et al.

[11] Patent Number: 5,492,749

[45] Date of Patent: Feb. 20, 1996

[54] ABSORBER WITH OPTIMIZED LOW FREQUENCY REFLECTION

[75] Inventors: Jean-Yves Solves, Antibes, France; Paul A. Kiciak, Boca Raton, Fla.

[73] Assignee: International Business Machines Corporation, Armonk, N.Y.

[21] Appl. No.: 286,575

[22] Filed: Aug. 4, 1994

[30] Foreign Application Priority Data

Sep. 21, 1993 [EP] European Pat. Off. .............. 93480146

[51] Int. Cl.[6] .............................. B32B 3/00; G06F 15/60; E04B 1/82

[52] U.S. Cl. .......................... 428/172; 428/141; 428/148; 428/212; 428/425.9; 364/481; 364/512; 181/284

[58] Field of Search ..................................... 422/156, 172; 428/141, 148, 212, 332, 425.9, 913, 404; 364/481, 512, 578; 181/284, 286

[56] References Cited

U.S. PATENT DOCUMENTS 5,016,185 5/1991 Kuester et al. .......................... 364/481
5,234,740 8/1993 Reeves et al. .......................... 428/167

*Primary Examiner*—Donald J. Loney

*Attorney, Agent, or Firm*—Jerry W. Herndon; Joscelyn G. Cockburn

[57] ABSTRACT

There is proposed the design of an absorber with the lowest reflection coefficient, especially between 30 and 150 Mhz where most of actual anechoic chambers exhibit problems. The absorber with optimized low frequency reflection comprises a a twisted pyramid having a length 11 and permittivity coefficients e1' and e1", a first layer adjacent the base of the pyramid having a width 12, and permittivity coefficients e2' and e2", and a second layer adjacent the first layer having a width 13, and permittivity coefficients e3' and e3", with 11 equal to 2.20 m (+/− 1 cm), 12 equal to 0.188 m (+/− 1 cm), 13 equal to 0.302 m (+/− 1 cm), and e1'=10 E (−0.370 LogF+1.005)(+/− 10%)

e1"=−10 E (−0.484 LogF+1.012)(+/− 10%)

e2'=10 E (−0.353 LogF+1.317)(+/− 10%)

e2"=−10 E (−0.222 LogF+0.789)(+/− 10%)

e'=10 E (−0.316 LogF+1.785)(+/− 10%)

e"=−10 E (−0.598 LogF+2.347)(+/− 10%)
in the range 30–150 Mhz.

3 Claims, 3 Drawing Sheets

ABSORBER WITH OPTIMIZED LOW FREQUENCY REFLECTION

TECHNICAL FIELD

The present invention relates to electromagnetic absorbers in general, and more particularly to an absorber with optimized low frequency reflection combining a two-layer absorber and a 'twisted' pyramid.

BACKGROUND OF THE INVENTION

Modern computing devices may emit radio frequencies anywhere in the range 30 Mhz to several Ghz, while compliance with national regulations often requires that products only emit within certain strict limits in the latter frequency range to prevent interference with communications. The devices need therefore be tested in environments provided by anechoic chambers the demand for which consequently regularly grows in the industry.

As stated in Scientific Report No. 105 from the Department of Electrical and Computer Engineering, University of Boulder, Colorado, USA, present-generation anechoic chambers exhibit excellent broad-band suppression of reflected waves in the microwave region using pyramidal absorbers. The very low reflections from pyramidal absorbers result from the fact that incident microwaves reflect several times from the cones before finally being reflected back into free space; since a fraction of the incident wave is absorbed at each bounce, the microwaves are very much diminished by the time they reflect back from an array of absorbers. The same type of absorber is sometimes used for lower frequency (30Mhz) waves. At low enough frequencies, however, the waves become much longer than the spacing between adjacent absorbers. Their skin-depths in the absorbing materials likewise become long compared to the size of the pyramids. This makes pyramid absorbers of limited usefulness for anechoic chambers to be used at lower frequencies.

At these lower frequencies, it is also possible to achieve low reflection coefficients using a single-layer dispersive absorber. Still another approach to designing anechoic chambers has been the use of multilayer absorbers. These absorbers are built to minimize reflection in a specified range of frequencies. Design of multilayer absorbers has been successfully performed using cut-and-try methods, Smith-chart methods and by numerical optimization techniques.

Finally, as stated again in the above-mentioned Scientific Report, it has been considered to combine the advantages of multilayer absorbers with those of pyramid absorbers. This is accomplished by replacing the top layer of a multilayer structure with a layer of pyramid absorbers. In such a structure, the effective material properties match continuously to the external medium, so good performance is expected in the range ot frequencies between the design frequency and the microwave region, where quasi-optical techniques are applicable. Such a structure is shown in FIG. 1. The advantage of this approach is that the higher frequency waves do not penetrate into the backing behind the pyramids due to their short wavelengths and skin depths, so microwave performance should be equal to that of absorbers originally designed for microwaves. The remaining layers can be adjusted so as to minimize reflection for lower frequencies.

The design optimization of an absorber comprising a twisted pyramid combined with a multilayer structure therefore proceeds in two phases:

computation of the reflection and transmission properties (S parameters) of the absorber, and a search for the design which minimizes the overall reflection.

Since ordinary absorbing pyramids are two-dimensionally periodic, it is feasible to compute their averaged or "effective" permittivity and permeability accurately with respect to fields which vary slowly with distance compared to the pyramids themselves. The technique for doing this is known as homogenization. Once the averaged material properties are computed, they may be looked up as needed, and used to solve for the S-parameters of the array of pyramids. Reflection from the overall structure can then be easily calculated from the S-parameters and the known properties of the backing layers. The method of computation is summarized below as extracted from the above-mentioned Scientific Report, and referring back to it. The backing layers are considered free to vary within certain practical bounds. The size and composition of these layers are controlled by a set of variables and constraints which constitute a problem space which is a subspace of Rn, where n is the total number of variables used to specify the backing layers. Then the design optimization process itself can start.

SUMMARY OF THE INVENTION

It is an object of the present invention to propose the design of an absorber with the lowest reflection coefficient, especially between 30 and 150 Mhz where most of actual anechoic chambers exhibit problems.

The invention specifically includes an absorber with optimized low frequency reflection comprising a twisted pyramid having a length 11 and permittivity coefficients e1' and e1", a first layer adjacent the base of the pyramid having a width 12, and permittivity coefficients e2' and e2", and a second layer adjacent the first layer having a width 13, and permittivity coefficients e3' and e3", with 11 equal to 2.20 m (+/– 1 cm), 12 equal to 0.188 m (+/– 1 cm), 13 equal to 0.302 m (+/– 1 cm), and e1'=10 E (–0.370 LogF+1.005)(+/– 10%)

e1"=–10 E (–0.484 LogF+1.012)(+/– 10%)

e2'=10 E (–0.353 LogF+1.317)(+/– 10%)

e2"=–10 E (–0.222 LogF+0.789)(+/– 10%)

e3'=10 E (–0.316 LogF+1.785)(+/– 10%)

e3"=–10 E (–0.598 LogF+2.347)(+/– 10%)

in the range 30–150 Mhz.

BRIEF DESCRIPTION OF THE DRAWINGS

The above introduction had to be read in conjunction with the following schematic.

Figure 1:
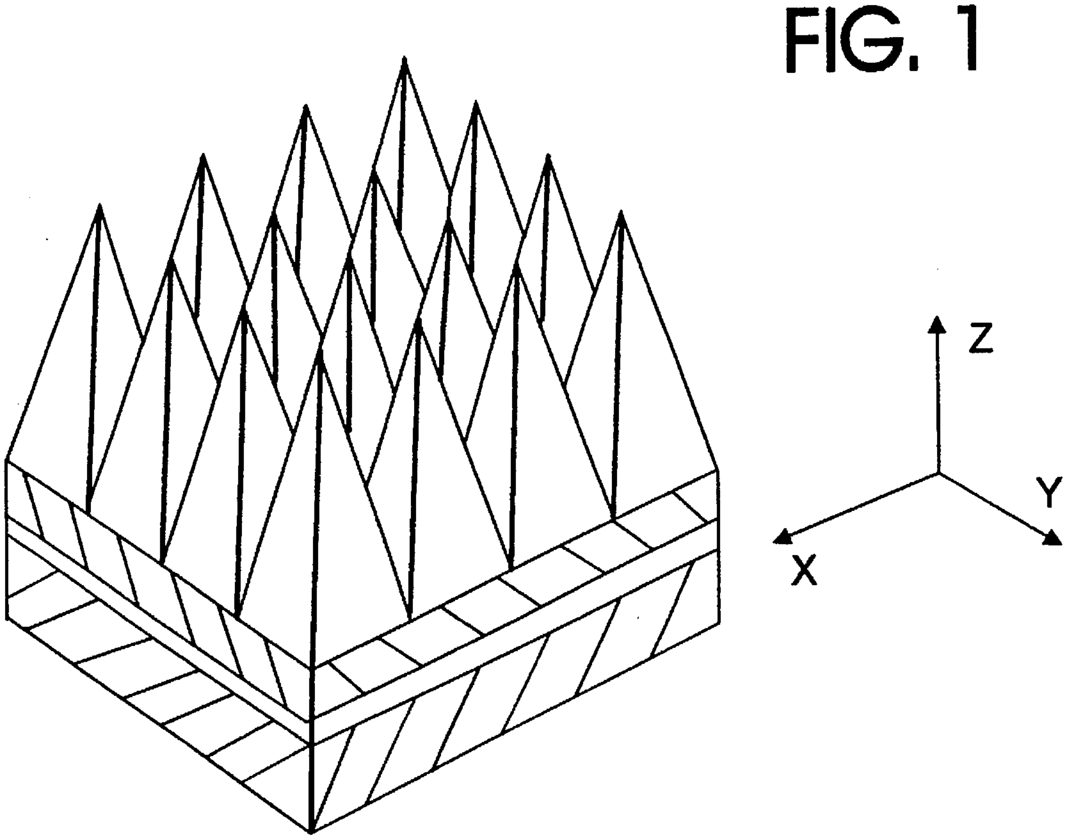
FIG. 1 being a representation of pyramid absorbers with multilayer backing.
Figure 2:
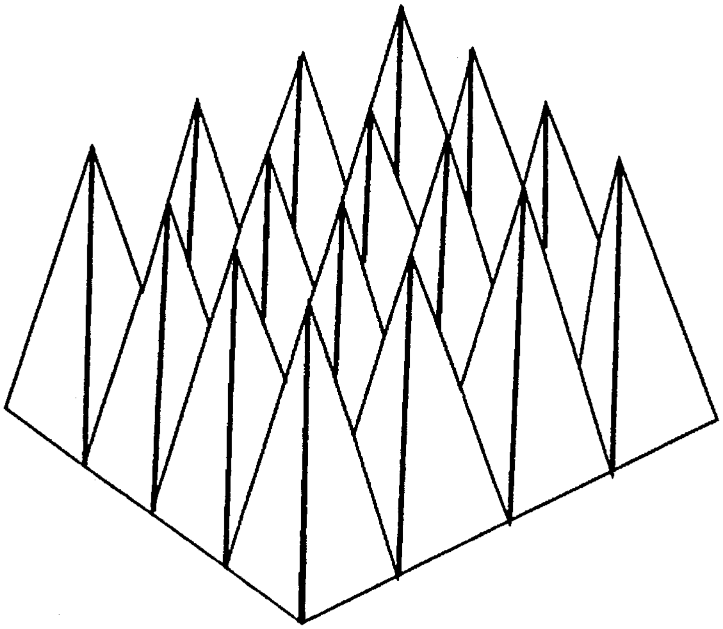

The invention will be better understood from the following detailed description read in conjunction with the following schematics:

FIG. 2 showing an array of rectangular pyramid absorbers.

Figure 3:
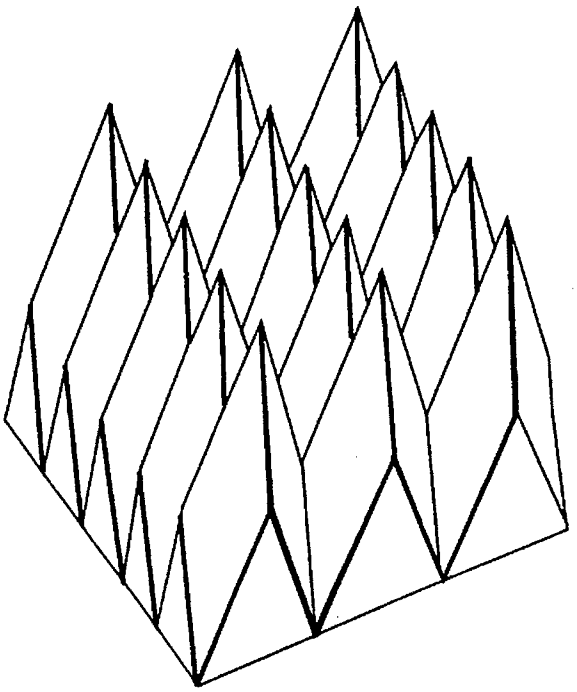

FIG. 3 showing an array of twisted pyramid absorbers.

Figure 4:
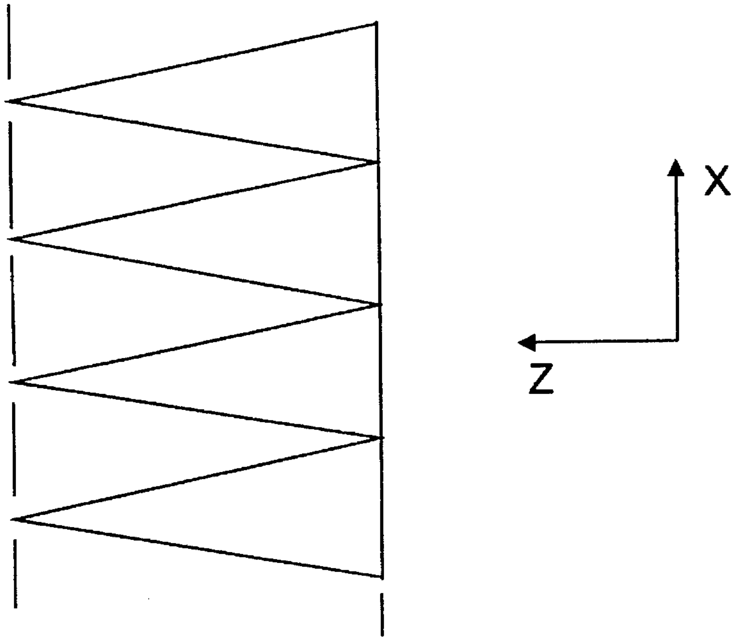

FIG. 4 showing a side view of pyramids.

Figure 5:
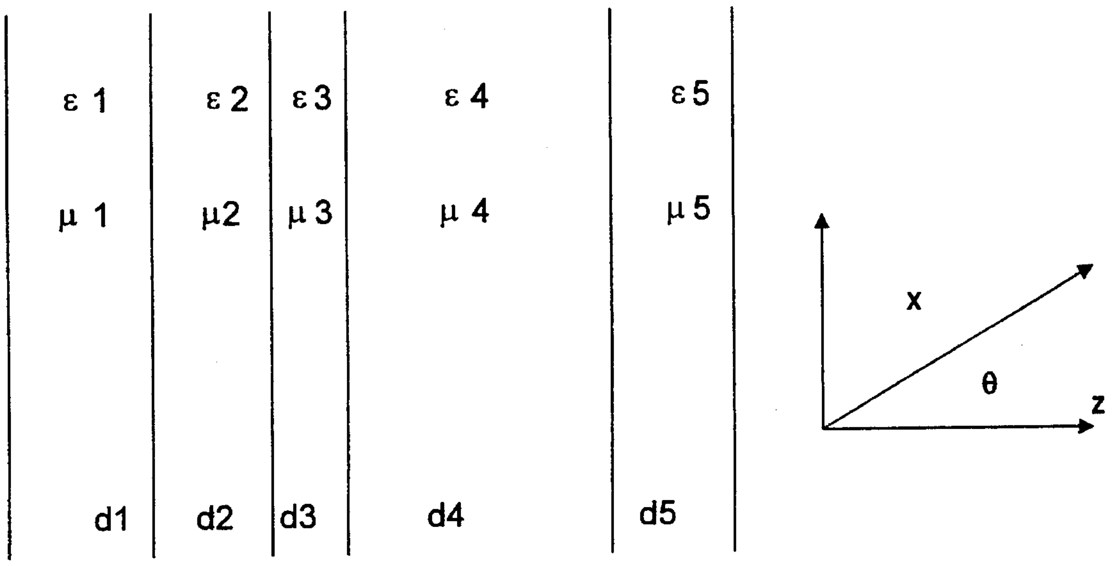

FIG. 5 showing multilayer stack of dielectric materials.

DETAILED DESCRIPTION

The object of Scientific Report No. 105 from the Department of Electrical and Computer Engineering, University of Boulder, Colorado, USA, was to come up with a computer program enabling design optimization for absorbers of an anechoic chamber as well as one design optimization itself. The program is based on the following modelization method, partially explained below,.the teaching of the above-mentioned Scientific Report being incorporated hereafter in its entirety.

MODELIZATION: COMPUTATION OF REFLECTIONS

HOMOGENIZATION

An array of pyramidal absorbers such as those used in anechoic chambers constitutes an absorbing structure which is periodic in two dimensions. At frequencies for which the period is small compared to a wavelength and skin depth, the fields can be considered quasi-static. The material therefore has average properties governing the large-scale variation of the fields. Effectively, inhomogeneity in two of the three axial directions can be averaged out, converting the actual medium to a one-dimensionally inhomogeneous, anisotropic artificial dielectric. The permittivity and permeability of the equivalent medium are intermediate between that of the absorber material and those of air. The tensor average permittivity and permeability are then diagonal, as see in the above-mentioned Scientific Report.

TRANSVERSE PROPERTIES

Plane-waves incident on the array at an angle theta from the z-axis may be decomposed into a combination of electric, or perpendicular, and magnetic, or parallel, polarizations. According to the above-mentioned Scientific Report, only average fields are assumed (no peak values). Two types of absorber geometry are considered for calculation of the transverse properties. In the first, the absorbers are simple pyramids with adjacent bases: the arrangement is said "rectangular" or "square" pyramids (see FIG. 2), since a section of the array is an array of squares. The second type of absorber consists of pyramids which are rotated 45 degrees with respect to the array. These are commonly known as "twisted" pyramids (FIG. 3). 'Average' longitudinal permittivity and permeability are exactly known for both geometries. Transverse properties on the contrary are approximated with equations. See the above-mentioned Scientific Report for details.

CHARACTERIZATION OF PYRAMID ABSORBERS

Once the equivalent material properties of the medium are known,it is possible to calculate average plane-wave reflection and transmission properties of the array of absorbers. These properties are characterized via S-paramaters. It has been shown that the reflection coefficients Gamma(z) obey the differential equation, known as the Ricatti equation:

$$\Gamma'(z) = 2\hat{\gamma}\Gamma(z) - \frac{\hat{Z}_c(z)}{2\hat{Z}_c(z)}\,[1 - \Gamma^2(z)]$$

Equation above is amenable to solution on a computer using a standard simultaneous differential equation solver (for the real and imaginary parts).

S-PARAMETERS OF THE ABSORBER-ARRAY

The strategy of this design method is to vary the absorbing layers behind the absorber-array while holding the properties of the pyramidal absorbers constant. It is clearly desirable, then, to know the transmission and reflection properties of the array in advance rather than to carry out a numerical solution of the Riccati equation every time a new reflection is computed during the optimization phase of a design sequence. Neglecting waves scattered by the cones at other angles (first and higher-order effects), the layer of cones at a given angle of incidence is equivalent to a two-port network in circuit theory (FIG. 4). The layers behind the cones, taken together, constitute another circuit element which is equivalent to a one port network with reflection coefficient Gamma b.

The values of the S-parameters can be computed and stored in data files for each angle and frequency of interest for both polarizations. The frequencies used for this procedure can range from 30 Mhz to 150 Mhz in 5 Mhz intervals, the angles from 0 degrees to 60 degrees in 5 degree intervals at each frequency. The program that performs these calculations is called CONES. See the above-mentioned Scientific Report for details.

REFLECTION FROM MULTILAYER MEDIA

It is considered a structure composed of several layers of homogeneous, isotropic dielectric materials as shown in FIG. 5. When the structure is excited by plane waves, the average fields within the layers are also plane waves, since there is no variation of the media transverse to the z-axis. The angle of propagation in each layer is determined by Snell's law. An incident wave may be decomposed into a combination of transverse electric and transverse magnetic polarized waves. Each of these waves being the sum of a forward traveling and a backward traveling wave. Those transverse electric and transverse magnetic polarized waves can be calculated separately for each layer. If the forward traveling and backward traveling waves are known at a layer i, they can be calculated at layer i+1. When the reflection coefficient Gamma 0 is known on one side of the multilayer structure, the total reflection coefficient Gamma n may then be calculated by multiplying several matrixes. This way, reflection or transmission of the whole structure may be characterized by a single complex 2×2 matrix.

Ordinarily, in an anechoic chamber, a single layer of homogeneous material underlies a tapered section of absorber. This material is typically identical to the taper material. This layer is mounted on a metallic conducting wall, which shields the chamber from external radiation. In this study several layers of different absorbers replace the single layer of typical cones. Since the metallic wall has a reflection coefficient of approximately −1, it is simple and straightforward to compute the plane-wave reflection coefficient at the top of each layer. This reflection coefficient is then used as Gamma b to give the approximate plane-wave reflection coefficient for the array of absorbers at their tips.

OPTIMIZATION

OPTIMIZATION ALGORITHM

Optimization is the name given to a set of numerical techniques which search out extrema (ordinarily minima) of a nonlinear function of many variables F(x). Generally, an optimization algorithm proceeds as follows:

Find a search direction p along which the function is decreasing.

Move a distance a along the search vector.

Go to first step above

The algorithm terminates if it either finds a minimum or is unable to make further progress. Different optimization procedures use different algorithms to solve each of the subproblems. The best choice of an optimization procedure depends on the character of the problem to be solved. One important characteristic of the present design problem is that it includes constraints. For instance, the overall length of the backing is subject to some practical limits; it cannot be too large, nor can it be negative. Further, while positive values of conductivity are permitted; negative values are not. Also, for materials considered here, there are practical upper and lower bounds on the permittivity. The optimization procedure used here must therefore be such as to permit consideration of upper and lower bounds on the variables and also consideration of (at least) linear constraints Designing a multilayer backing for pyramid absorbers may be computationally intensive. Therefore, the algorithm should be reasonably efficient that is, it should not require a great deal of work in each iteration. The most powerful optimization methods require that the function be smooth, single-valued function; these methods take advantage of the smoothness to speed convergence and estimate closeness to the solution. Further criteria must also be satisfied to guarantee a solution. For the reasons described above, a variable-scale optimizer is chosen, which finds a Kuhn-Tucker point subject to upper and lower bounds on the variables and to general linear and nonlinear constraints; this type of optimization algorithm is considered the most powerful. Such an optimizer (E04UCF) is provided in the Numerical Analysis Group (NAG) library of Fortran subroutines 19. The optimization procedure is a quasi-Newton algorithm, which is suitable for finding unconstrained, linearly constrained or nonlinearly constrained minima of nonlinear functions. See the above-mentioned Scientific Report for further details.

PARAMETERIZATION OF THE BACKING LAYERS

In this study, a nonlinear optimization subroutine was chosen from the Numerical Analysis Group (NAG) library of Fortran subroutines. This subroutine minimizes a function of several variables, subject to upper and lower bounds on the variables and, if desired, to user-defined linear and nonlinear constraints. In order to code the optimization problem, it was necessary to specify the properties of the backing layers in terms of a number of adjustable parameters, which became variables of the optimization. There are many possible choices of optimization variables which could be used to solve the design problem. One possible choice would be to specify each layer directly in terms of its S-parameters. Although this approach might sound appealing, it is in fact unsatisfactory for two reasons: first, it would require eight variables per layer (since the numbers are complex); second, and more important, it would be difficult to model the physics of the problem in a realistic manner. Modeling on this basis would be complicated by the need to compute restrictions on the S-parameters that would be imposed by fixing the layer thickness as in a real design, and modeling of the dispersion of the absorbing media would be impossible. Further, the "optimal" design might be physically unrealizable because the material properties which would be required to manufacture the design might be unattainable. A superior approach is to make the layer thicknesses and some parameters which determine the material properties variables of the optimization. These variables are suitable for optimization because they are simply constrained to a region corresponding to realizable designs, and the dispersion of the media can be modeled parametrically. The criteria for selection of suitable optimization variables are as follows:

only a small number of variables should be required per layer.

they must be able to represent realistic values of the permittivity and permeability.

if possible, the variables should be chosen to automatically exclude physically unrealistic behavior by imposing simple constraints.

SELECTION OF PARAMETERS

In order to obtain suitable parameters, certain assumptions were made about the electromagnetic properties of the backing layers. Specifically, it was assumed that the materials were non-magnetic and consisted of absorbing foam similar to that of standard pyramid absorbers (polyurethane foam impregnated with graphite and fire retardants). These assumptions limit the class of functions which may reasonably be used to represent the frequency dependence of the permittivity. Even limiting the class of allowable epsilon versus frequency characteristics to those of Standard absorbing-foam material's, a wide range of characteristics was producible, but the frequency dependence of epsilon is by no means arbitrary. From the stand-point of performance, this means that the optimal design produced under these strictures may not be the best design possible if many different types of materials were considered. From the standpoint of computation, however, the simplification of the model which resulted from these assumptions about the absorber materials is justified because it resulted in an optimization problem which was smaller, and thus easier to solve, while providing useful results. See the above-mentioned Scientific Report for further details.

CONSTRAINTS ON THE VARIABLES

The values of the variables are subjected to constraints in order to prevent them from taking on unrealistic or unreasonable values. These constraints, like the variables themselves, were selected to model behavior similar to that of ordinary absorber materials. In addition, an overall constraint was enforced on the length of the backing section. The length of each layer was required to be less than or equal to the overall length. Conveniently, the choice of parameters eliminates the need for nonlinear constraint functions, although such functions are easy to add using E04UCF. The constraints on optimization parameters are shown in the above-mentioned Scientific Report. Alternatively, it is quite feasible to optimize the backing layers using fixed material properties. This may be especially desirable where computation time is expensive, or where there is some uncertainty as to whether materials can be inexpensively made to order. This may, in practice, often be the case because process controls on impregnating of polyurethane foam with carbon and fire retardants are crude. In this case, the parameterization stage is simply bypassed in the optimization program and use the measured properties of available materials. The same program is easily used for both cases, provided the upper and lower bounds on the appropriate variables are set equal to one another, allowing no variation. Loss of computing efficiency due to carrying excess variables in these highly restricted cases is small.

OBJECTIVE FUNCTIONS

The optimization problem is to minimize a function of many variables that are subject to various bounds. The function to be minimized is called the objective function. See the above-mentioned Scientific Report for further details.

LFmin PROGRAM

The program LFmin implements all of the functions in Fortran. The functional units of LFmin are listed below, along with their functions.

EPS: Provides bulk material properties for the backing layers and defines the parameterization of these properties. If the backing is fixed, EPS looks them up from an array.

FUN: Computes plane-wave amplitude reflection coefficients from the complete absorbing structure as it is currently configured.

OBJN0: Compute the objective functions and their gradients The gradients are estimated by finite-differencing the function FUN. OBJNO is used for cases in which the angle is fixed at normal incidence, while OBJNA computes norms over a range of incidence angles.

E04UCF: (Provided by numerical Analysis Group) conducts the search for the optimum value of the objective function.

LFmin: Defines the size of the problem (number of layers), specifies constraints on the variables and the linear constraint on total length of the backing layers, sets the sampling points for frequency and angle, sets the order of the norms for the objective function and selects the appropriate files for material data and S-parameters of the pyramids in the top layer. All of these features are set at runtime. When the search for the minimum terminates, LFmin reports the final values of the objective function, the final vector of variables, and the gradient of the objective function at this point.

PRIOR ART: DESIGN OPTIMIZATION

As stated in the above-mentioned Scientific Report, once a program (LFabs) has been developed which can minimize the reflections from a hybrid pyramid-multilayer design, it is desirable to determine what degree of improvement upon existing design is actually made.

In anechoic chambers, reflections occur at all possible angles, and regardless of the placement of transmit and receive antennas within the chamber, some of the oblique reflection are very important. For this reason, it is important to consider off normal reflections when designing absorbers. From a practical standpoint, it seems that angles greater than 45° are relatively unimportant; any ray path from the transmit to receive antenna must include at least one reflection at an incidence angle of less than 45°, unless the chamber is long and thin in which case more than one type Of absorber should be used.

Because the length constraints used in the design problem are small relative to the longer wavelength, it is expected that a small number of backing layers would be needed to approach the best possible design. The optimization program LFmin, was designed to accept no more than five backing layers. In early experiments, when a large number of backing layers was used, the optimization program usually either reduced some of thicknesses to zero or set the materials of adjacent layers equal to one another. Effectively LFmin reduced the actual number of backing layers to one, two or three for optimal cases.

Comparison of some two layer and three layer sample problem showed that the solution to the three layer problem is, if not identical to the two layer solution marginally better. It is therefore decided to concentrate on two layer optimization problem. Moreover the main criteria is to get the best possible design (in terms of reflection coefficient) that can be easily manufacturable. This mean that standards manufacturer dielectric materials absorbers shape and length are used. At this time for mechanical and performances reason 8 foot length absorbers (pyramidal or twisted pyramidal) are typically used in 30 Mhz-1 Ghz chambers. This implies that our design was concentrated on an height foot structure.

The design optimization led to the following results:

Twisted Pyramid geometry

Taper: 2.2 m

Layer 1: 0.315 m

Layer 2: 0.081 m

NOTE: first layer is adjacent to the metallic wall, second layer is adjacent to the tapers.

The permitivity of the dielectric material used in this design are described in page 48 of the above-mentioned Scientific Report.

An abstract of the performance of this design in terms of reflection coefficient (Gamma) is given underneath Gamma Max in Transverse Electric Mode:

0° incident wave angle: 0.1485

15° incident wave angle: 0.1564

30° incident wave angle: 0.1855

45° incident wave angle: 0.2563

Gamma Max in Transverse Magnetic Mode:

0° incident wave angle: 0.1485

15° incident wave angle: 0.1352

30° incident wave angle: 0.1198

45° incident wave angle: 0.1898

NEW DESIGN OPTIMIZATION

The new design optimization according to the invention proceeded as follows:

1. Characterize the complex permittivity from 30 to 150 Mhz of different absorbing material (polyurethan foam doped with carbon) used by manufacturers. The carbon loading of these measured materials currently are:

0.05 0.07 0.13 0.2 0.3 0.4 0.5 0.6 0.7 0.8 0.9 1.0 1.2 lb/cubic ft.

2. Use this result as input parameters in the program LFabs for low frequency (30–150 Mhz).

3. Once the design is completed a sensitivity analysis is performed to ensure the stability of the design over permittivity and lengths variations. A 10% variation on the permitivity coupled to a 1 cm variation applied on all the different lengths have been performed on this design. The results have shown no more than 10% variation on the reflection coefficient implying a good stability of the design.

The goal of this design is to obtain the lowest reflection coefficient, especially between 30 and 150 Mhz where most of actual chambers exhibit problems. This mean that all design effort done in this frequency area is paid over 100 Mhz where Gamma has increased slightly compared to traditional absorbers. Anyway present chamber having a comfortable margin in this frequency bandwidth, it seems reasonable to accept this fact.

The design optimization led to the following results:

Twisted Pyramid geometry

Taper: 2.2 m

Layer 1: 0.188 m

Layer 2: 0.302 m

In the present design according to the invention, the layers are listed in a table from air to the metallic wall and for each layer, length, loading and measured permittivity are given.

| (air) Twisted pyramid length: 2.2 m loading: 0.05 lb/cu ft | | | Layer 1 length: 0.188 m loading: 0.2 lb/cu ft | | | Layer 2 (adjacent wall) length: 0.302 m loading: 0.9 lb/cu ft | | |
|---|---|---|---|---|---|---|---|---|
| F (Mhz) | e' | e" | F (Mhz) | e' | e" | F (Mhz) | e' | e" |
| 30.00 | 2.90 | −1.961 | 30.00 | 6.21 | −2.86 | 30.00 | 20.58 | −29.68 |
| 35.00 | 2.72 | −1.841 | 35.00 | 5.92 | −2.80 | 35.00 | 19.77 | −26.55 |
| 40.00 | 2.57 | −1.741 | 40.00 | 5.68 | −2.75 | 40.00 | 19.06 | −24.15 |
| 45.00 | 2.47 | −1.661 | 45.00 | 5.46 | −2.69 | 45.00 | 18.44 | −22.30 |
| 50.00 | 2.36 | −1.591 | 50.00 | 5.28 | −2.65 | 50.00 | 17.88 | −20.79 |
| 55.00 | 2.27 | −1.521 | 55.00 | 5.11 | −2.60 | 55.00 | 17.38 | −19.55 |
| 60.00 | 2.19 | −1.461 | 60.00 | 4.96 | −2.56 | 60.00 | 16.92 | −18.52 |
| 65.00 | 2.12 | −1.401 | 65.00 | 4.82 | −2.52 | 65.00 | 16.51 | −17.63 |
| 70.00 | 2.06 | −1.351 | 70.00 | 4.70 | −2.48 | 70.00 | 16.13 | −16.85 |
| 75.00 | 2.00 | −1.311 | 75.00 | 4.58 | −2.44 | 75.00 | 15.78 | −16.18 |
| 80.00 | 1.96 | −1.271 | 80.00 | 4.48 | −2.41 | 80.00 | 15.45 | −15.58 |
| 85.00 | 1.92 | −1.231 | 85.00 | 4.38 | −2.37 | 85.00 | 15.14 | −15.05 |
| 90.00 | 1.89 | −1.201 | 90.00 | 4.29 | −2.34 | 90.00 | 14.85 | −14.58 |
| 95.00 | 1.84 | −1.161 | 95.00 | 4.21 | −2.31 | 95.00 | 14.59 | −14.14 |
| 100.00 | 1.81 | −1.121 | 100.00 | 4.12 | −2.28 | 100.00 | 14.34 | −13.75 |
| 105.00 | 1.79 | −1.101 | 105.00 | 4.05 | −2.25 | 105.00 | 14.11 | −13.39 |
| 110.00 | 1.76 | −1.081 | 110.00 | 3.98 | −2.22 | 110.00 | 13.89 | −13.05 |
| 115.00 | 1.73 | −1.051 | 115.00 | 3.92 | −2.20 | 115.00 | 13.68 | −12.74 |
| 120.00 | 1.71 | −1.031 | 120.00 | 3.85 | −2.17 | 120.00 | 13.48 | −12.46 |
| 125.00 | 1.68 | −1.001 | 125.00 | 3.80 | −2.15 | 125.00 | 13.29 | −12.20 |
| 130.00 | 1.66 | −.981 | 130.00 | 3.74 | −2.12 | 130.00 | 13.11 | −11.95 |
| 135.00 | 1.65 | −.961 | 135.00 | 3.69 | −2.10 | 135.00 | 12.95 | −11.72 |
| 140.00 | 1.62 | −.941 | 140.00 | 3.64 | −2.07 | 140.00 | 12.79 | −11.51 |
| 145.00 | 1.60 | −.921 | 145.00 | 3.59 | −2.05 | 145.00 | 12.64 | −11.31 |
| 150.00 | 1.59 | −.911 | 150.00 | 3.54 | −2.03 | 150.00 | 12.49 | −11.12 |

Carbon loadings are those that allowed to obtain claimed result, but, it will be obvious to the man skilled in the art that other combinations of loadings could be considered leading to equivalent results. Above results are experimental ones, but functions of e' and e" depending on F can be closely approximated in the range 30 Mhz to 150 Mhz by:

Twisted pyramid:

e'=10 E (−0.370 LogF+1.005)(+/− 10%)

e"=−10E (−0.484 LogF+1.012)(+/− 10%)

Layer 1:

e'=10 E (−0.353 LogF+1.317)(+/− 10%)

e"=−10 E (−0.222 LogF+0.789)(+/− 10%)

Layer 2:

e'=10 E (−0.316 LogF+1.785)(+/−10%)

e"=−10 E (−0.598 LogF+2.347)(+/− 10%)

The above show that Log(e') or Log(e") are linear functions of Log(F) in the range 30–150 Mhz?

The following tables give the reflection coefficient (Gamma) of the related design for different incident angles and polarization. Reflection coefficient (Gamma) is computed from 30 to 150 Mhz for incident wave angles of 0°, 15°, 30°, 45° for both Transverse Electric mode and Transverse Magnetic mode:

| Freq. | Mag. | Phase |
|---|---|---|
| Angle = 0.000000000000000E + 000 E-polarized | | |
| 30.0 | .0539 | −28. |
| 35.0 | .0476 | 95. |
| 40.0 | .0881 | 77. |
| 45.0 | .0945 | 59. |
| 50.0 | .0822 | 49. |
| 55.0 | .0756 | 49. |

-continued

| Freq. | Mag. | Phase |
|---|---|---|
| 60.0 | .0845 | 49. |
| 65.0 | .1006 | 39. |
| 70.0 | .1136 | 22. |
| 75.0 | .1188 | 1. |
| 80.0 | .1176 | −22. |
| 85.0 | .1099 | −46. |
| 90.0 | .0971 | −73. |
| 95.0 | .0829 | −99. |
| 100.0 | .0688 | −128. |
| 105.0 | .0542 | −161. |
| 110.0 | .0428 | 164. |
| 115.0 | .0358 | 128. |
| 120.0 | .0310 | 90. |
| 125.0 | .0284 | 58. |
| 130.0 | .0257 | 26. |
| 135.0 | .0228 | −3. |
| 140.0 | .0191 | −27. |
| 145.0 | .0154 | −49. |
| 150.0 | .0112 | −72. |
| Angle = 15.000000000000000 E-polarized | | |
| 30.0 | .0602 | −9. |
| 35.0 | .0549 | 86. |
| 40.0 | .0946 | 76. |
| 45.0 | .1013 | 60. |
| 50.0 | .0887 | 50. |
| 55.0 | .0800 | 50. |
| 60.0 | .0867 | 50. |

| Freq. | Mag. | Phase |
|---|---|---|
| 65.0 | .1019 | 43. |
| 70.0 | .1153 | 28. |
| 75.0 | .1214 | 9. |
| 80.0 | .1212 | −13. |
| 85.0 | .1143 | −35. |
| 90.0 | .1019 | −60. |
| 95.0 | .0873 | −84. |
| 100.0 | .0724 | −111. |
| 105.0 | .0563 | −140. |
| 110.0 | .0429 | −172. |
| 115.0 | .0339 | 153. |
| 120.0 | .0279 | 114. |
| 125.0 | .0251 | 79. |
| 130.0 | .0232 | 46. |
| 135.0 | .0214 | 16. |
| 140.0 | .0187 | −7. |
| 145.0 | .0159 | −29. |
| 150.0 | .0125 | −50. |
| Angle = 30.000000000000000 E-polarized | | |
| 30.0 | .0961 | 32. |
| 35.0 | .0913 | 77. |
| 40.0 | .1233 | 76. |
| 45.0 | .1290 | 65. |
| 50.0 | .1152 | 56. |
| 55.0 | .1011 | 54. |
| 60.0 | .1001 | 55. |
| 65.0 | .1107 | 52. |
| 70.0 | .1237 | 42. |
| 75.0 | .1317 | 28. |
| 80.0 | .1343 | 12. |
| 85.0 | .1299 | −6. |
| 90.0 | .1195 | −25. |
| 95.0 | .1054 | −44. |
| 100.0 | .0895 | −63. |
| 105.0 | .0709 | −84. |
| 110.0 | .0532 | −106. |
| 115.0 | .0382 | −129. |
| 120.0 | .0248 | −156. |
| 125.0 | .0162 | 170. |
| 130.0 | .0112 | 122. |
| 135.0 | .0111 | 71. |
| 140.0 | .0118 | 39. |
| 145.0 | .0124 | 16. |
| 150.0 | .0123 | −4. |
| Angle = 45.000000000000000 E-polarized | | |
| 30.0 | .1827 | 70. |
| 35.0 | .1757 | 88. |
| 40.0 | .1955 | 87. |
| 45.0 | .1970 | 79. |
| 50.0 | .1813 | 71. |
| 55.0 | .1615 | 67. |
| 60.0 | .2003 | 66. |
| 65.0 | .2002 | 66. |
| 70.0 | .1576 | 61. |
| 75.0 | .1647 | 54. |
| 80.0 | .1693 | 44. |
| 85.0 | .1680 | 32. |
| 90.0 | .1614 | 20. |
| 95.0 | .1496 | 8. |
| 100.0 | .1356 | −4. |
| 105.0 | .1179 | −17. |
| 110.0 | .0996 | −28. |
| 115.0 | .0823 | −38. |
| 120.0 | .0654 | −47. |
| 125.0 | .0516 | −54. |
| 130.0 | .0394 | −58. |
| 135.0 | .0294 | −58. |
| 140.0 | .0236 | −56. |
| 145.0 | .0196 | −51. |
| 150.0 | .0177 | −44. |
| Angle = 0.000000000000000E + 000 M-polarized | | |
| 30.0 | .0539 | −28. |
| 35.0 | .0476 | 95. |
| 40.0 | .0881 | 77. |
| 45.0 | .0945 | 59. |

| Freq. | Mag. | Phase |
|---|---|---|
| 50.0 | .0822 | 49. |
| 55.0 | .0756 | 49. |
| 60.0 | .0845 | 49. |
| 65.0 | .1006 | 39. |
| 70.0 | .1136 | 22. |
| 75.0 | .1188 | 1. |
| 80.0 | .1176 | −22. |
| 85.0 | .1099 | −46. |
| 90.0 | .0971 | −73. |
| 95.0 | .0829 | −99. |
| 100.0 | .0688 | −128. |
| 105.0 | .0542 | −161. |
| 110.0 | .0428 | 164. |
| 115.0 | .0358 | 128. |
| 120.0 | .0310 | 90. |
| 125.0 | .0284 | 58. |
| 130.0 | .0257 | 26. |
| 135.0 | .0228 | −3. |
| 140.0 | .0191 | −27. |
| 145.0 | .0154 | −49. |
| 150.0 | .0112 | −72. |
| Angle = 15.000000000000000 M-polarized | | |
| 30.0 | .0670 | −29. |
| 35.0 | .0352 | 88. |
| 40.0 | .0768 | 75. |
| 45.0 | .0853 | 58. |
| 50.0 | .0740 | 47. |
| 55.0 | .0658 | 48. |
| 60.0 | .0730 | 50. |
| 65.0 | .0886 | 43. |
| 70.0 | .1023 | 27. |
| 75.0 | .1091 | 7. |
| 80.0 | .1102 | −15. |
| 85.0 | .1049 | −39. |
| 90.0 | .0946 | −64. |
| 95.0 | .0823 | −89. |
| 100.0 | .0696 | −116. |
| 105.0 | .0557 | −147. |
| 110.0 | .0440 | −178. |
| 115.0 | .0360 | 148. |
| 120.0 | .0300 | 112. |
| 125.0 | .0267 | 79. |
| 130.0 | .0239 | 47. |
| 135.0 | .0213 | 17. |
| 140.0 | .0182 | −7. |
| 145.0 | .0151 | −29. |
| 150.0 | .0115 | −51. |
| Angle = 30.000000000000000 M-polarized | | |
| 30.0 | .0670 | −30. |
| 35.0 | .0227 | −4. |
| 40.0 | .0447 | 57. |
| 45.0 | .0588 | 45. |
| 50.0 | .0521 | 31. |
| 55.0 | .0394 | 30. |
| 60.0 | .0378 | 45. |
| 65.0 | .0501 | 50. |
| 70.0 | .0650 | 38. |
| 75.0 | .0757 | 21. |
| 80.0 | .0827 | 1. |
| 85.0 | .0845 | −21. |
| 90.0 | .0820 | −44. |
| 95.0 | .0761 | −66. |
| 100.0 | .0692 | −89. |
| 105.0 | .0600 | −114. |
| 110.0 | .0504 | −139. |
| 115.0 | .0422 | −164. |
| 120.0 | .0345 | 169. |
| 125.0 | .0286 | 143. |
| 130.0 | .0234 | 115. |
| 135.0 | .0192 | 87. |
| 140.0 | .0158 | 64. |
| 145.0 | .0130 | 40. |
| 150.0 | .0102 | 18. |
| Angle = 45.000000000000000 M-polarized | | |
| 30.0 | .1895 | −27. |

-continued

| Freq. | Mag. | Phase |
|---|---|---|
| 35.0 | .1017 | −36. |
| 40.0 | .0676 | −25. |
| 45.0 | .0670 | −18. |
| 50.0 | .0696 | −28. |
| 55.0 | .0627 | −43. |
| 60.0 | .0496 | −57. |
| 65.0 | .0339 | −65. |
| 70.0 | .0223 | −54. |
| 75.0 | .0236 | −29. |
| 80.0 | .0347 | −23. |
| 85.0 | .0463 | −31. |
| 90.0 | .0566 | −45. |
| 95.0 | .0616 | −60. |
| 100.0 | .0659 | −75. |
| 105.0 | .0679 | −92. |
| 110.0 | .0666 | −109. |
| 115.0 | .0635 | −124. |
| 120.0 | .0593 | −140. |
| 125.0 | .0540 | −154. |
| 130.0 | .0483 | −168. |
| 135.0 | .0423 | 179. |
| 140.0 | .0366 | 168. |
| 145.0 | .0314 | 157. |
| 150.0 | .0264 | 148. |

The following result is obtained:
Gamma Max in Transverse Electric Mode:

0° incident wave angle: 0.1188

15° incident wave angle: 0.1214

30° incident wave angle: 0.1290

45° incident wave angle: 0.1970

Gamma Max in Transverse Magnetic Mode:

0° incident wave angle: 0.1188

15° incident wave angle: 0.1102

30° incident wave angle: 0.1090

45° incident wave angle: 0.1895

The man skilled in the art will appreciate the improvement over prior art design obtained results as described above.

We claim:

1. An absorber with optimized low frequency reflection comprising:

a twisted pyramid having a flat base side, a first length (11) and a first pair of permittivity coefficients (e1' and e1"), a first layer adjacent the base side of the pyramid and having a second length (12), and a second pair of coefficients (e2' and e2"), and a second layer adjacent the first layer and having a third length (13) and a third pair of permittivity coefficients (e3' and e3"), said absorber being characterized in that the first length (11) is equal to 2.20 m (+/− 1 cm), the second length (12) is equal to 0.188 m (+/− 1 cm, the third length (13) is equal to 0.302 m (+/− 1 cm), and e1'=10 E (−0.370 LogF+1.005)(+/− 10%)

e1"=−10 E (−0.484 LogF+1.012)(+/− 10%)

e2'=10 E (−0.353 LogF+1.317)(+/− 10%)

e2"=−10 E (−0.222 LogF+0.789)(+/− 10%)

e3'=10 E (−0.316 LogF+1.785)(+/− 10%)

e3"=−10 E (−0.598 LogF+2.347)(+/− 10%)

in the range 30–150 Mhz, wherein permittivity is a complex function of the form e'+ie" where e' is a real value and e" is an imaginary value and e1', e2' and e3' are real values of permittivity measured at the frequency F megahertz and e1", e2" and e3" are imaginary values of permittivity measured at the frequency F megahertz.

2. The absorber according to claim 1, characterized in that said twisted pyramid and the first and second layers are made of polyurethane loaded with carbon.

3. The absorber according to claim 2, characterized in that the loading of carbon is respectively 0.05 lb/cu ft, 0.2 lb/cu ft and 0.9 lb/cu ft for said twisted pyramid, and the first and second layers.

* * * * *